(12) United States Patent
Lebel

(10) Patent No.: US 6,804,855 B2
(45) Date of Patent: Oct. 19, 2004

(54) WINDSHIELD WIPER INCLUDING VARIABLE PRESSURE TENSION ARM

(76) Inventor: Francois Lebel, 303-285 Chemin de Faitieres, Piedmont, Quebec (CA), J0R-1K0

( * ) Notice: Subject to any disclaimer, the term of this patent is extended or adjusted under 35 U.S.C. 154(b) by 0 days.

(21) Appl. No.: 10/374,334

(22) Filed: Feb. 27, 2003

(65) Prior Publication Data

US 2004/0168278 A1 Sep. 2, 2004

(51) Int. Cl.[7] ................................................ B60S 1/32
(52) U.S. Cl. ............................... 15/250.202; 15/250.351
(58) Field of Search ..................... 15/250.202, 250.351, 15/250.352, 250.203

(56) References Cited

U.S. PATENT DOCUMENTS

| | | | | | |
|---|---|---|---|---|---|
| 1,681,724 A | * | 8/1928 | Demand | ................ | 15/250.202 |
| 2,120,945 A | * | 6/1938 | Sprankle | ................ | 15/250.202 |
| 2,332,660 A | * | 10/1943 | Mussen et al. | ....... | 150/250.202 |
| 2,481,192 A | * | 9/1949 | Borsuk | ................... | 15/250.202 |
| 2,715,239 A | * | 8/1955 | Mintz | .................... | 15/250.202 |
| 5,320,333 A | * | 6/1994 | Koch | ......................... | 267/155 |

* cited by examiner

Primary Examiner—Gary K. Graham

(57) ABSTRACT

An elongated tension arm is provided on a wiper of a windshield wiper assembly. The tension arm biases a wiper arm of the wiper about a wiper head of the wiper. The tension arm has a tension arm head with a tension arm leg extending longitudinally therefrom. The tension arm head overlies the wiper arm head and the tension arm leg overlies the wiper arm. The tension arm head is coupled to the wiper arm head via a pair of arm members extending laterally therefrom. The arm members receive an anchoring screw therethrough which underlies the wiper arm head. The tension arm leg has a threaded hole therethrough receiving a wing screw which engages the wiper arm. Rotation of the wing screw serves to increase or decrease resilient pressure on the wiper arm.

1 Claim, 3 Drawing Sheets

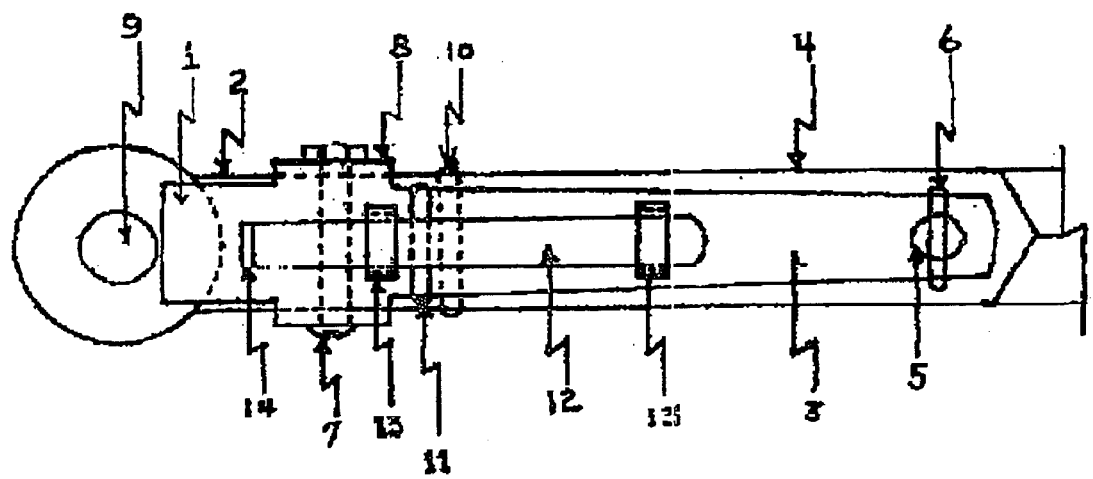
FIG: 5
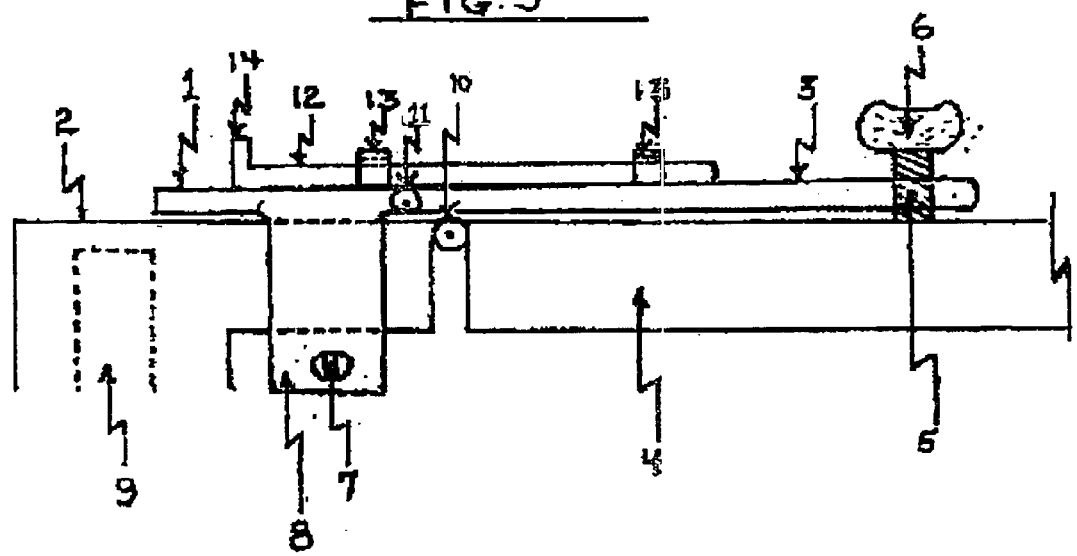
FIG: 6

WINDSHIELD WIPER INCLUDING VARIABLE PRESSURE TENSION ARM

CROSS-REFERENCE TO RELATED APPLICATIONS

Listed below are samples of similar patent that, I have reviewed before submitting my invention. All the patents serve the purpose of maintaining a wiper blade or a windshield. However, there is not one that functions like my invention. These similar patents serve the purpose of keeping the wiper blade on the windshield, but in a different way.

| Inventor | Patent No.: | Date of patent |
| --- | --- | --- |
| Kota Sridhar | 6,301,742 B1 | Oct. 16, 2001 |
| Raynaud | 6,282,743 B1 | Sep. 4, 2001 |
| Shuen | 6,195,832 B1 | Mar. 6, 2001 |
| Blachetta and al. | 5,771,527 | Jun. 30, 1998 |
| Battlogg | 5,613,267 | Mar. 25, 1997 |
| Harmon and al. | 5,421,055 | Jun. 6, 1995 |
| Jean Koch | 5,320,333 | Jun. 14, 1994 |
| Honda and al. | 4,993,102 | Feb. 19, 1991 |
| Steward Sr. | 5,008,971 | Apr. 23, 1991 |
| Fukumoto and al. | 5,056,182 | Oct. 15, 1991 |
| Buchannan and al. | 5,062,175 | Nov. 5, 1991 |
| Okuda and al. | 4,718,139 | Jan. 12, 1988 |
| Watanabe | 4,698,872 Canada | Oct. 13, 1987 |
| Jean Koch | CA 2122993 | Feb. 18, 1994 |
| Marcello Scorsiroll | CA 2022734 | Aug. 2, 1990 |
| Raymond Bacconnier | CA 2065072 | Aug. 23, 1990 |
| Marcello Scorsiroll | CA 1287454 | May 7, 1987 |

STATEMENT REGARDING FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKROUND OF THE INVENTION

The arm of the windshield wiper of a motor car contains some mechanics integrated into the arms of for supports of a windshield wiper to maintain certaine pressure on the blade and keeps it agains the glass. Usually this integrated mechanic wich is stretched in between a base fixed to a flute tree of training and swiveling arm of windshield wiper, do not kick away enough space to release a moment of rather long arm to create so a self-importance pressureon the blade, by contribution in the force exercised by integrated mechanic. The integrated mechanic must be extremely powerful by contribution in the force of arm and the pivot to create a sufficient mattering moment to generate a good pressure on the blade so that in his turn, sweeps it of the glass producing an action of wiping satisfying on the glass. What usually arrives at high speed of the vehicule or when the vehicule faces strong winds, the effect of uprising led by the wind on the arm of support of the blade of the windshield wiper counter balance the force exercised by the integrated mechanic and so reduce the action of wiping of the blade. It does not exist in away or mean known allowing to keep a steady and constant pressure according to the need of the moment (speed of the motor car, the strength of the wind). The Tension Arm with variable pressure on the part of the arm of the windshield wiper comes to correct the situation by applying a constant pressure against the arm of the windshield wiper.

BRIEF SUMMARY OF THE INVENTION

The invention is a removable add-on to the arms of a windshield wiper system of a motor car, the Tension Arm keeps the windshield wiper blade on the glass by applying a constant pressure. The pressure exercised on the blade forces the blade to stay on the glass for a better wiping action. The Tension Arm follows the same axis as the arm of support, of the windshield wiper of a motor car that it's anchored too. The wing screw situated at the extremity of the leg of the Tension Arm applies pressure on the windshield wiper. Thus, forcing the blade of the windshield wiper to stay on the glass, regardless of the strength of the wind, or the speed the car is going.

BRIEF DESCRIPTION OF THE DRAWINGS

FIG. 5: Is a top view of the Tension Arm, with variable pressure mounted on a portion of the arm of the support of a winshield wiper of a motor car but with variants, allowing to lift the windshield wiper from the glass for a easier cleaning FIG. 6: Is a side view of the assembly of FIG. 5.

DETAILED DESCRIPTION OF THE INVENTION

Figure 1:
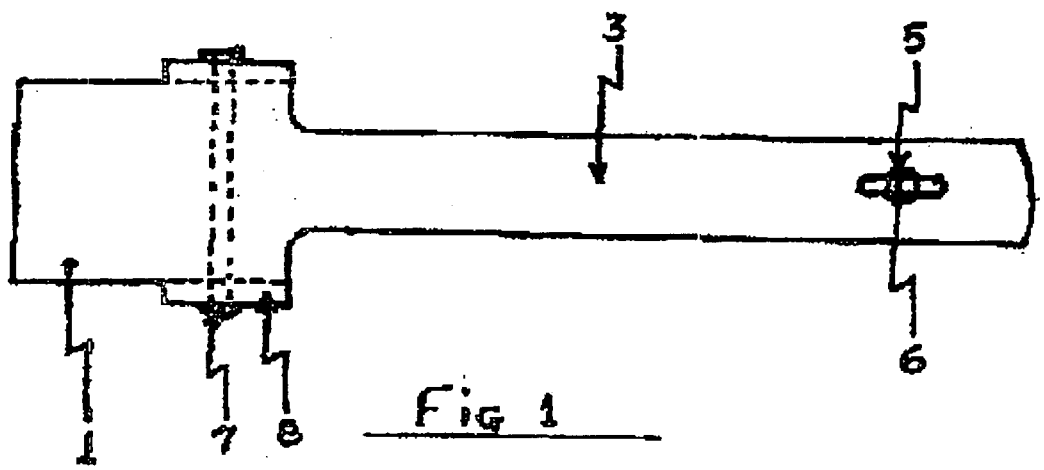
FIG. 1: Is a top view of the Tension Arm, with variable pressure
Figure 2:
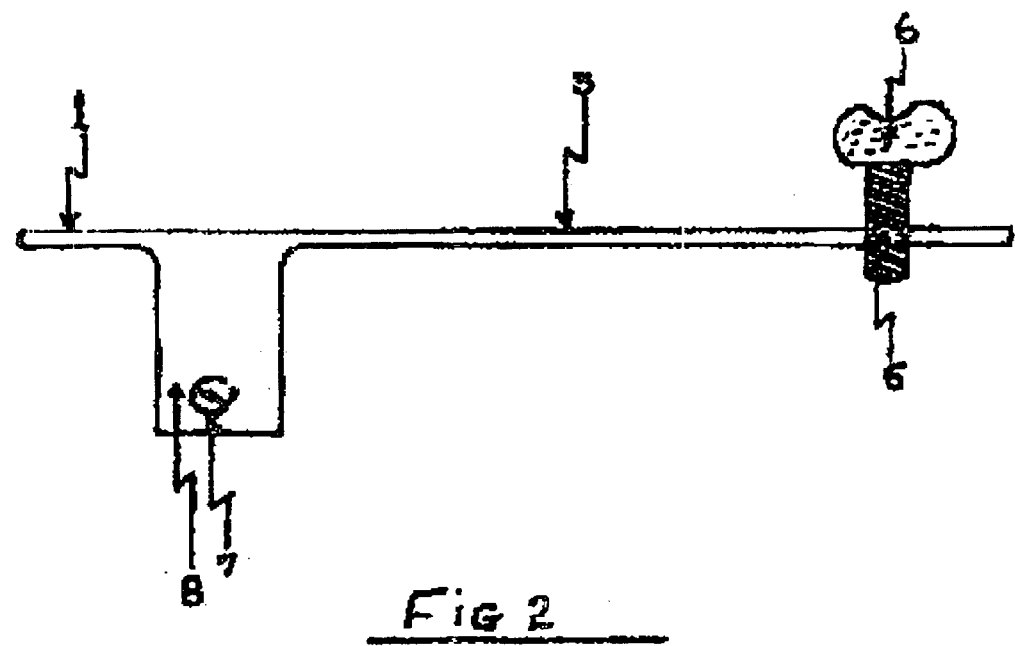
FIG. 2: Is a side view of the assembly FIG. 1

Drawing FIG. 1 and FIG. 2

The Tension Arm, of variable pressure is removable, it consists of the head (1), of the Tension Arm, which is anchored with the head (2), of arm supports of a windshield wiper. An arm member (8), of the Tension Arm slips on each sides of the head (2), of the support of the windshield wiper, so allowing the insertion of its anchoring screw (7), which stabilizes the Tension Arm on the head (2), of the arm of the support of the windshield wiper. Thus allowing, the Tension Arm to follow the same axis of the arm (4), of the windshield wiper. The leg (3), is equipped with a threaded hole (5), at its extremity for the purpose of installing a wing nut (6), serving to apply a resilient pressure on a portion of the arm (4), of support of a windshield wiper. The Tension Arm with variable pressure can be fabricated of various materials, from a plastic being able to resist any change of temperature and having the necessary strength to take the pressure exercised on the leg (3) of the Tension Arm, via the wing nut (6), without suffering any distortion. Also by mean of various metal, iron, aluminium and other materials. It is also possible to use various dimension and various thickness, some others sorts of anchoring devices for the manufacturing process, as long as these last ones resist to the same pressure without undergoing any deformation.

Figure 3:
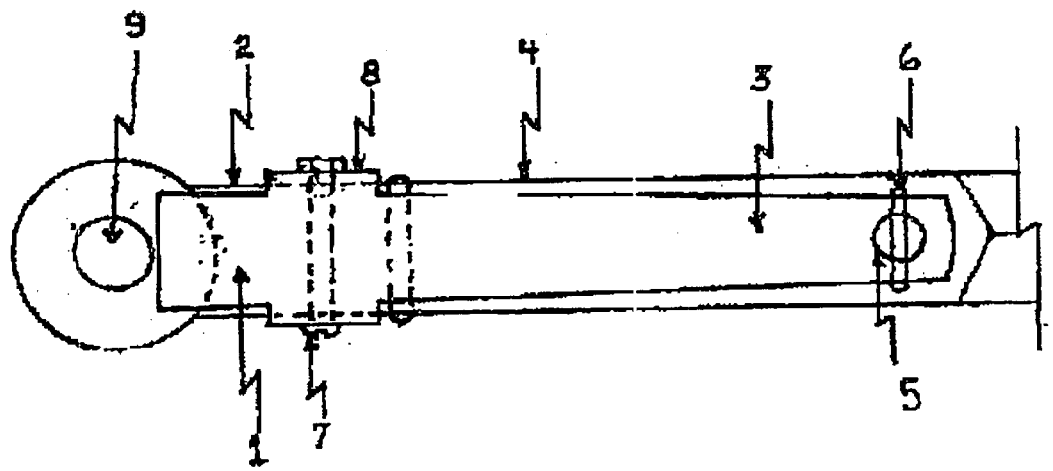
FIG. 3: Is a top view of the Tension Arm, with variable pressure mounted on a portion of the arm of support of a windshield wiper of a motor car.
Figure 4:
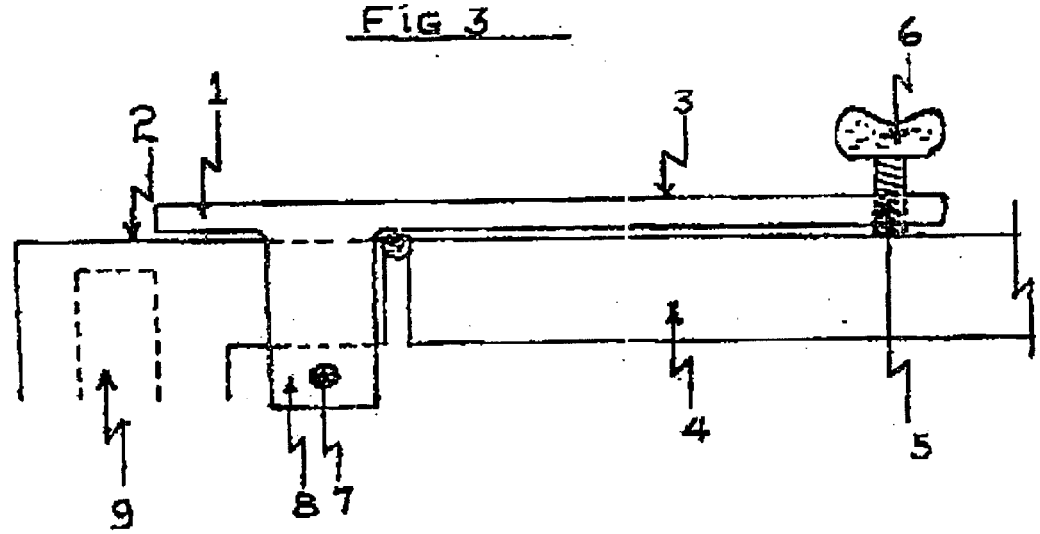
FIG. 4: Is a side view of the assembly of FIG. 3.

Drawing FIG. 3 and FIG. 4

The Tension Arm is installed simply by sliding the arm (8), of the Tension Arm on each side of the head (2), of the support, of the windshield wiper. The head (2), is anchored to the shaft (9), of the motor, of the windshield wiper. A hole (5), is drilled at the extremity of the arm (8), of the Tension Arm, allowing the insertion of a anchoring screw (7), that stabilise the Tension Arm, on the windshield wiper. The leg (3), of the Tension Arm, follows horizontally the arm of the support of the windshield wiper (4). The extremity of the leg (3), of the Tension Arm, is drilled with a threaded hole (5), allowing the insertion of a wing screw (6). The wing screw (6), applies a resilient pressure by turning it manually in the desired direction for more or less pressure. The pressure is transferred on a portion of the arm (4), of the windshield wiper, which has the effect of maintaining the blade of the windshield wiper in the desired position on the glass, permitting a better wiping action. The Tension Arm, being coupled on a portion of the head (2), of arm of supports, of the windshield wiper and stabilised by being couple after the shaft (9), of the system of the windshield wiper, the pressure can only be transferred toward the glass.

Drawing FIG. 5 and FIG. 6

The system of the windshield wiper of a motor car, allows the blade of the windshield wiper, to be raised off the windshield for better, efficient cleaning. Between the head (2), of the windshield wiper and the arm (4), of the support of the windshield wiper there is a hinge (10), allowing to lift the blade off the glass. The same movement on the Tension Arm is obtained by installing a hinge (11), between the head (1), and the leg (3) of the Tension Arm. The hinge (11), of the Tension Arm, needs to be located before the hinge (10) of the support of the windshield wiper, to allow proper lifting of the blade and Tension Arm at the same time. The leg (3) of the Tension Arm, is retained in place by adding a channel bracket (13) on the head & leg of the Tension Arm (1), allowing the insertion of a clasp. By sliding a clasp (12) through both channel brackets (13), the leg (3) of the Tension Arm is being held by the clasp (12). The clasp locks the leg of the Tension Arm in place, allowing the wing screw (6), to apply the necessary pressure, maintaining the blade of the windshield wiper on the glass. The clasp (12), is retained in place by the pressure applied by the wing screw (6). The pressure applied on the arm (4) of the support, of the windshield wiper, is transferred upward to the clasp (12). The clasp, is equipped with a handle (14), to facilitate its retreat when the necessity of cleaning the glass appears. (Such as snow)

What is claimed is:

1. A windshield wiper assembly comprising:

a windshield wiper having an elongated wiper arm pivotally coupled with a wiper head, said wiper head being attached to a shaft;

an elongated tension arm having opposing longitudinal ends, said tension arm is mounted to said wiper for biasing the wiper arm about said wiper head, said tension arm has a tension arm head with a tension arm leg extending longitudinally therefrom, said tension arm head overlies said wiper arm head and said tension arm leg overlies said wiper arm, the tension arm head is coupled to the wiper arm head via a pair of arm members extending laterally therefrom and spaced from the ends of the tension arm, the arm members receive an anchoring screw therethrough which underlies said wiper arm head, the tension arm leg has a threaded hole therethrough receiving a wing screw therein which engages the wiper arm;

wherein rotation of the wing screw serves to increase or decrease resilient pressure on the wiper arm.

* * * * *